March 31, 1942.  G. F. HAUF  2,278,074
FLEXIBLE PIPE JOINT
Filed Aug. 2, 1940  2 Sheets-Sheet 1
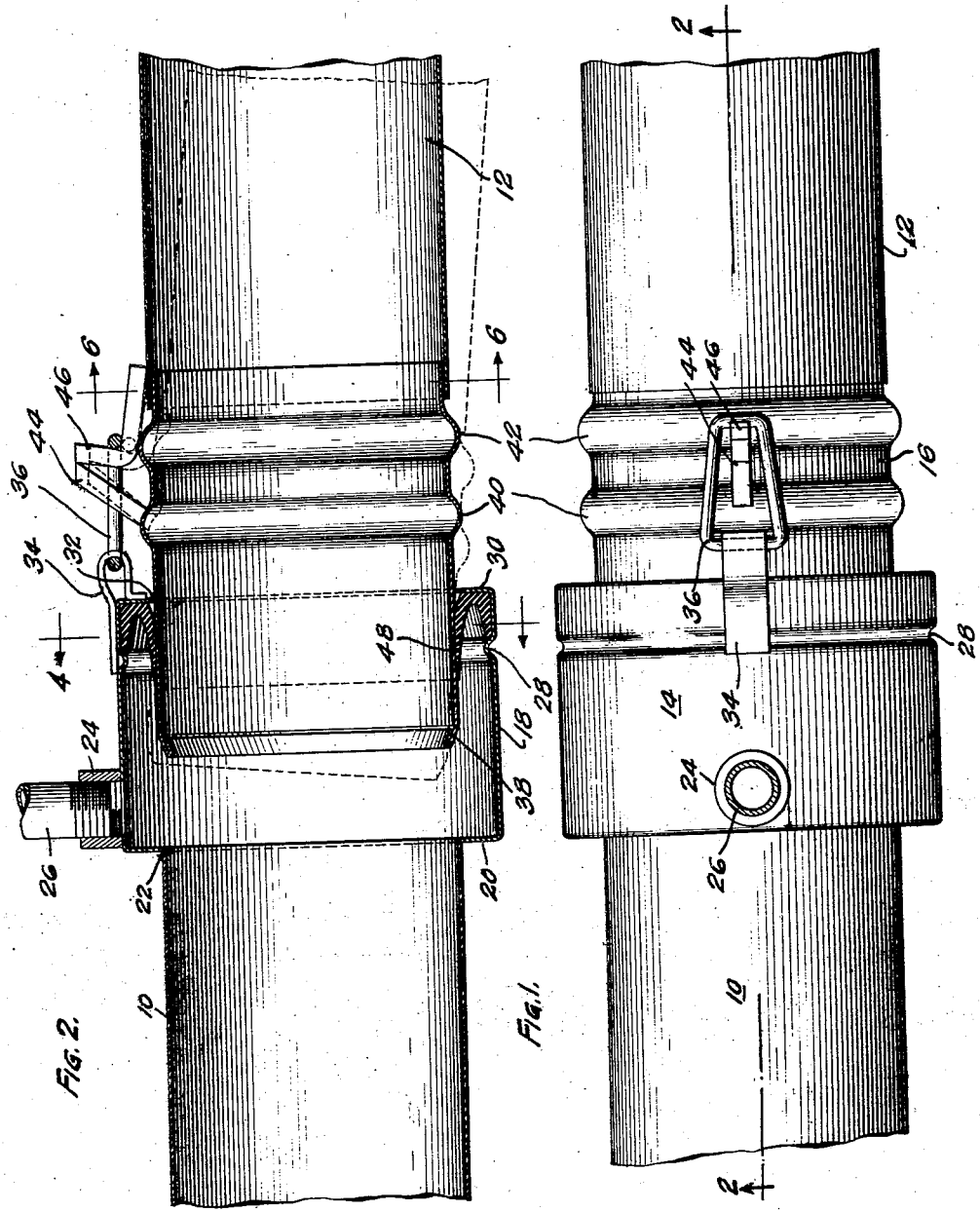
INVENTOR.
GEORGE F. HAUF
BY Harry H. Hitzeman
ATTORNEY.

March 31, 1942.  G. F. HAUF  2,278,074
FLEXIBLE PIPE JOINT
Filed Aug. 2, 1940  2 Sheets-Sheet 2
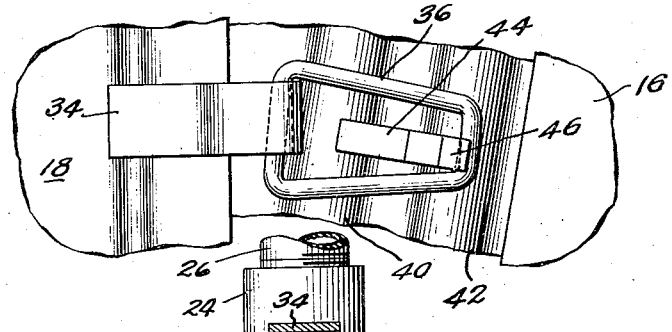
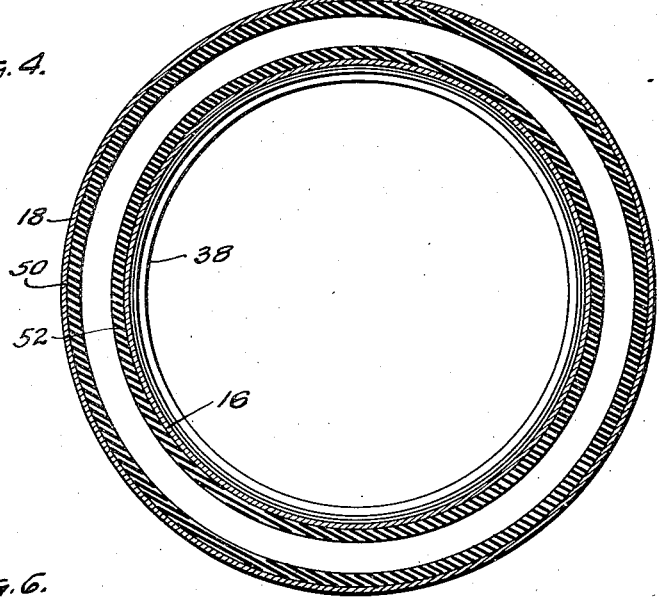
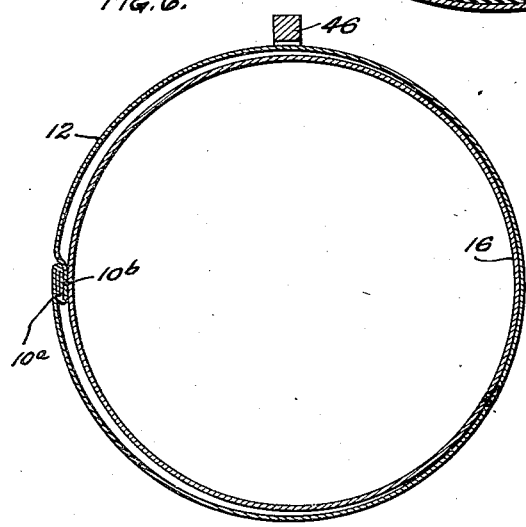
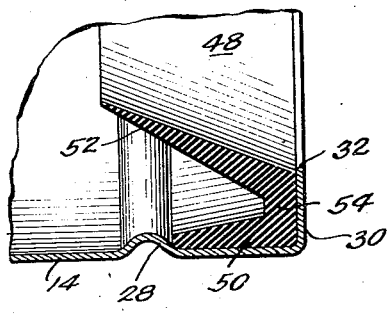
INVENTOR.
GEORGE F. HAUF
BY Harry W. Hitzeman
ATTORNEY.

Patented Mar. 31, 1942

2,278,074

UNITED STATES PATENT OFFICE 2,278,074

FLEXIBLE PIPE JOINT

George F. Hauf, River Forest, Ill.

Application August 2, 1940, Serial No. 349,535

4 Claims. (Cl. 285—170)

My invention relates to improvements in flexible pipe joints or couplings and an improved method of manufacturing the same; and more particularly to flexible pipe joints or couplings particularly adapted to connect together lengths of irrigation piping.

Piping for irrigation purposes is ordinarily constructed of sheet metal such as galvanized iron in suitable lengths having coupler elements on both ends, usually a male coupling member on one end and a female coupling member on the other, so that they may be telescopically joined by some quick detachable means, the coupling members also usually permitting limited angular misalignment of the piping to follow the surface terrain of the land to be irrigated. Since such piping is frequently disassembled and moved to new locations from time to time, it follows that the coupler and quick detachable means must, of necessity, be as simple and easy to operate as possible, yet be rugged and durable so that the same will not easily become broken or out of order. Further, since the flexible joints must be fluid proof and capable of withstanding comparatively high pressures, special attention should be given to the construction of the same.

The principal object of the present invention is to provide for piping of the type described, an improved type of coupling means.

A further object of the invention is to provide an improved process of manufacturing pipe coupling members of the type described.

A further object of the invention is to provide prefabricated male and female connector members capable of connection to lengths of pipe of any description so that when an order for irrigation piping is received the pipe may be cut to the desired lengths, the connector members attached thereto and the complete piping is ready to be shipped.

A further object of the invention is to provide in combination with my improved connector members an improved flexible gasket or collar capable of maintaining a sealed connection under unusually high pressures and in any angular alignment of the pipe sections.

A further object of the invention is to provide an improved and simple type of coupling detaching means so that pipe sections may be easily disconnected even though the coupler members are not easily accessible, such as when buried in mud or lying in the bottom of a ditch as frequently happens in some localities where irrigation pipes are employed.

Other objects and advantages will be more apparent from the following description wherein reference is had to the accompanying two sheets of drawings, upon which Fig. 1 is a plan view of my improved coupler member showing a pair of pipe sections connected thereby;

Fig. 2 is a longitudinal sectional view through the same taken generally on the lines 2—2 of Fig. 1;

Fig. 3 is a fragmentary plan view showing the quick detachable coupler member in the position it assumes when the two sections of pipe that are connected are disposed at angles;

Fig. 4 is a cross-sectional view through the connector elements of the coupling, taken generally on the lines 4—4 of Fig. 2;

Fig. 5 is an enlarged fragmentary sectional view showing the sealing gasket in position in the female coupler element prior to the insertion of the male coupler element; and Fig. 6 is a cross-sectional view taken on the lines 6—6 of Fig. 2 showing the manner in which the male coupler member is connected to the pipe.

In the embodiment of the invention which I have chosen to illustrate, in Fig. 1 and Fig. 2 I have shown a pair of pipe sections 10 and 12 of any suitable or desirable length having associated therewith the female coupler element 14 and the male coupler element 16 respectively. The pipes 10 and 12, while they may be formed of any desirable material such as cast iron, wrought iron or sheet metal, are preferably shown as a comparatively thin galvanized sheet metal piping that is formed from flat material shaped about a mandrel and sealed with the overlapping edge portions 10a and 10b as shown in Fig. 6.

The coupler member 14 may be formed with the cylindrical portion 18 having a side wall 20 formed with a circular opening 22 therein. The forward end of pipe 10 is adapted to be inserted in said opening and securely welded to the coupler member about the opening 22. A shoulder or boss 24 may be mounted upon the top of the coupler member 18 and formed with a tapped bore to receive a vertical header 26. The wall 18 is preferably formed with an inwardly directed bead or groove portion 28 at a point spaced from the vertical wall 30. This wall is also provided with a cylindrical opening 32. A bracket member 34 in the form of a flat strap iron member is adapted to be attached to the upper wall of the coupler 14 with a forwardly disposed loop to receive a link member 36.

The pipe 12 is provided with the male coupler member 16 which extends into the pipe 12 a desired distance and is securely welded therein so that a water-tight or fluid-tight seal is formed between the pipe and the male coupler member. The male coupler member may be formed of galvanized sheet iron or other suitable material about a mandrel to an exact size, and is adapted when inserted into the end of pipe 12 to provide as the end portion of the pipe a section which is absolutely accurate in its dimensions. The coupler member 16 may be formed with a forward inwardly tapered lip portion 38 and a pair of parallel ridges 40 and 42 adjacent the end that is engaged in the pipe 12. I also secure, by welding or otherwise, a pair of bar members 44 and 46 to the male coupler member 16, the bar member 44 disposed at a forward angle from the coupler member, and the bar 46 being generally L-shaped and positioned against the same to provide generally an abutment or shoulder over which the link 36 may be secured.

To provide an effective seal to prevent leakage of fluid between the male and female coupler members, I provide a generally V-shaped gasket member 48 formed with two annular diverging lip portions 50 and 52 which extend from a thickened apex portion 54. The lip 50 fits against the inner face of the female coupler member 14, being of such size that its extended edge will bear against the annular groove 28. The lip 52 is of a tapered or conical form, and when the pipes are not connected by the couplers, the lip 52 occupies the position shown in Fig. 5. Thus, when the tapered end 38 of the male coupler member 16 is inserted into the coupler member 14, it spreads the tapered lip 52 outwardly as shown in Fig. 2, the lip hugging the inserted member and affording a liquid-tight joint. Thus fluid under pressure which is passing through the pipe bears against the inner or opposing faces of the lips, and as a consequence it forces the lip portion 50 against the wall 18 and forces the lip portion 52 against the outer surface of the male member 16. Due to the resiliency of the material of which the gasket member is constructed, and due to the clearance of the opening 32 around the member 16, it can be seen that the pipe 12 may be angularly moved with relation to pipe 10 or vice versa, and an effective seal will always be formed between the engaging parts.

When the pipe 12 is swung to an angle as shown in dotted lines in Fig. 2, the lip portion 52 swings from an apex at 54, thus causing only a slight stretching or strain upon this portion of the gasket in this position and no other strain or stretching upon any other portion of the gasket. This makes it much easier to swing the pipe sections to desired angular positions than with other types of sealing means shown in the prior art.

In order therefore, to assemble together sections of irrigation pipe provided with my improved male and female coupler members, it is only necessary to set the gasket 48 in the position shown, insert the male member through the gasket sufficiently so that the link can pass over the upper edge of bar 46. When fluid under pressure is placed in the pipe line, the same will have a tendency to not only force the sealing member 48 against the walls of the male and female contactor members, but it will also serve to draw the connection taut between the link 36 and the member 46. When it is desired to disconnect the pipe sections, and even though they may be submerged in mud or ditches and are comparatively inaccessible, it is an easy matter to reach down with a hook member and engage below one side of the link 36 to disconnect the pipe sections.

In addition to offering rigidity and strength to the member 16, the ridge 40, since its outside diameter is larger than the opening 32, will serve as a stop means limiting the extent to which the coupler member 16 may be inserted into the member 14.

While I have illustrated and described a specific embodiment of my invention, it will be apparent to those skilled in the art that I have provided an extremely simple coupler member for pipe sections. The coupler members are accurately formed and need only be secured to the ends of the pipe section in order to provide flexible coupling members between the same. It will also be apparent that my improved gasket member and the simple way in which it is assembled into the coupler member, provide a very efficient and fluid-tight seal.

What I desire to secure and protect by Letters Patent of the United States is:

1. A flexible pipe coupling comprising a pipe member having a rigid, accurately formed cylindrical sleeve connected thereto and extending therefrom said sleeve having an upstanding circular ridge thereon spaced from the end, a second pipe member having an enlarged, rigid, accurately formed cylindrical collar member connected thereto and extended therefrom, said collar member having a transverse front wall, a circular groove in said collar spaced from said front wall, an enlarged circular opening in said front wall to loosely receive said sleeve but not the circular ridge thereon and a resilient circular gasket positioned in said collar member against the front wall thereof, said gasket having a lip tapering to a feather edge adapted to be stretched when the sleeve is inserted into said collar, said gasket substantially V-shaped in cross-section with its base against the front wall of said collar and the other lip thereof against said circular groove, and a quick-detachable pivotally mounted connector for holding said pipe members against separation.

2. A flexible pipe coupling comprising a pipe member having a rigid, accurately formed cylindrical sleeve connected thereto and extending therefrom, said sleeve having a pair of upstanding circular ridges thereon spaced from the end, a second pipe member having an enlarged, rigid, accurately formed cylindrical collar member connected thereto and extended therefrom, each collar member having a transverse front wall, an enlarged circular opening therein to loosely receive said sleeve but not the circular ridges thereon and a resilient circular gasket positioned in said collar member against the front wall thereof, said gasket having a lip tapering to a feather edge adapted to be stretched when the sleeve is inserted into said collar, said gasket substantially V-shaped in cross-section with its base against the front wall of said collar and a quick-detachable pivotally mounted connector for holding said pipe members against separation, said gasket so constructed that fluid under pressure bears against the inside of its V-formation to push its base against the transverse front wall and each of the lips against the outside surface of the sleeve and the inside surface of the collar respectively.

3. The combination with a flexible pipe coupling which includes a male pipe member and a female pipe member telescopically joined together and having a sealing gasket therebetween, of quick detachable pivotally mounted connector means for holding said pipe members against separation, said connector means including a member fastened to said male pipe with an upright leg thereon bent back at less than 90° from the pipe, a generally rectangularly shaped link member pivotally connected to said second pipe member adapted to receive the upright leg on said male member to normally connect said pipe members in pivotal relationship, but permitting a disconnection of the same when the engaged end of said link is pulled outwardly in the direction of said leg.

4. Quick detachable connector means for irrigation piping of the type wherein one pipe has an enlarged cylindrical collar on its end and another has its cylindrical end telescoped into an annular gasket contained in said collar, said connector means including a strap member on said collar forming a loop extending beyond the end of the same, a generally rectangularly shaped link member pivotally connected in said loop, said link capable of vertical or horizontal pivotal movement in said loop, and a generally L-shaped bar member secured to the telescoped pipe member spaced from the end thereof, the upstanding leg of said bar member capable of being received in the pivoted link to form a connector between said pipes permitting angular change therebetween either vertically or horizontally, said upright leg of the bar member bent back at less than 90° from the pipe to normally connect said pipe members in pivotal relationship, but permitting a disconnection of the same when the engaged end of said link is pulled in the direction of the upright leg.

GEORGE F. HAUF.